United States Patent
Hayashi

(10) Patent No.: US 11,009,697 B2
(45) Date of Patent: May 18, 2021

(54) MIRROR DRIVING DEVICE, OPTICAL SCAN CONTROL APPARATUS, AND MIRROR DRIVING METHOD

(71) Applicant: Yugo Hayashi, Tokyo (JP)

(72) Inventor: Yugo Hayashi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 156 days.

(21) Appl. No.: 16/366,219

(22) Filed: Mar. 27, 2019

(65) Prior Publication Data

US 2019/0324266 A1  Oct. 24, 2019

(30) Foreign Application Priority Data

Apr. 18, 2018 (JP) .............................. JP2018-080208

(51) Int. Cl.
G02B 26/10 (2006.01)
G02B 26/12 (2006.01)

(52) U.S. Cl.
CPC ......... *G02B 26/123* (2013.01); *G02B 26/101* (2013.01); *G02B 26/127* (2013.01)

(58) Field of Classification Search
CPC .. G02B 26/0858; G02B 26/10; G02B 26/101; G02B 26/105; G02B 26/123; G02B 26/127; G02B 26/12; H02N 2/0075; B81B 3/00
See application file for complete search history.

(56) References Cited

U.S. PATENT DOCUMENTS

| | | | | |
|---|---|---|---|---|
| 6,995,896 B2* | 2/2006 | Yamabana | ......... | G02B 26/0841 359/290 |
| 8,964,273 B2* | 2/2015 | Horie | .................. | G02B 7/1821 359/199.1 |
| 2005/0253055 A1* | 11/2005 | Sprague | ............. | G02B 26/0858 250/234 |
| 2008/0239252 A1* | 10/2008 | Konno | ............... | G02B 27/0025 353/98 |
| 2011/0170156 A1* | 7/2011 | Takayama | ............ | G02B 26/105 359/213.1 |
| 2012/0242191 A1 | 9/2012 | Aimono | | |
| 2013/0258432 A1* | 10/2013 | Aimono | ............. | G02B 26/0858 359/200.8 |
| 2018/0065149 A1* | 3/2018 | Morikawa | ............. | B06B 1/0607 |

FOREIGN PATENT DOCUMENTS

JP    2012-198415    10/2012

* cited by examiner

*Primary Examiner* — Balram T Parbadia
(74) *Attorney, Agent, or Firm* — IPUSA, PLLC

(57) ABSTRACT

A mirror driving device includes a detector configured to output a detection signal having a ringing component included in oscillation of a mirror, a driving waveform generator configured to generate a sawtooth driving waveform that oscillates the mirror, a superimposing waveform generator configured to generate a superimposing waveform to be superimposed to the sawtooth driving waveform, a periodic signal generator configured to generate a periodic signal having a frequency identical to or near a ringing frequency of the ringing component, a correlation calculator configured to calculate a correlation value between the periodic signal and the detection signal, and an amplitude adjuster configured to adjust an amplitude of the superimposing waveform to reduce the ringing component, based on the correlation value.

19 Claims, 8 Drawing Sheets

MIRROR DRIVING DEVICE, OPTICAL SCAN CONTROL APPARATUS, AND MIRROR DRIVING METHOD

CROSS-REFERENCE TO RELATED APPLICATIONS

This application is based on and claims priority to Japanese Patent Application No. 2018-080208 filed on Apr. 18, 2018, the entire contents of which are incorporated herein by reference.

BACKGROUND OF THE INVENTION

1. Field of the Invention

The present invention relates to a mirror driving device, an optical scan control apparatus, and a mirror driving method.

2. Description of the Related Art

An example of a conventional optical scanning device includes a mirror part that is rotated around a rotation axis to deflect light and perform an optical scan to form an image, for example. In such an optical scanning device, a driving source uses a voltage having sawtooth waveform.

An example of an optical deflector driving device is proposed in Japanese Laid-Open Patent Publication No. 2012-198415, for example.

However, ringing may be generated due to resonant oscillation of the mirror part when the mirror part is driven. This ringing may cause deterioration of an image quality of the image that is formed by the scanning of the optical scanning device.

SUMMARY OF THE INVENTION

Embodiments of the present invention can provide a mirror driving device, an optical scan control apparatus, and a mirror driving method that can reduce the ringing that is generated in an optical scanning device.

According to one aspect of embodiments of the present invention, a mirror driving device including a detector configured to output a detection signal having a ringing component included in oscillation of a mirror; a driving waveform generator configured to generate a sawtooth driving waveform that oscillates the mirror; a superimposing waveform generator configured to generate a superimposing waveform to be superimposed to the sawtooth driving waveform; a periodic signal generator configured to generate a periodic signal having a frequency identical to or near a ringing frequency of the ringing component; a correlation calculator configured to calculate a correlation value between the periodic signal and the detection signal; and an amplitude adjuster configured to adjust an amplitude of the superimposing waveform to reduce the ringing component, based on the correlation value.

According to another aspect of the embodiments of the present invention, an optical scan control apparatus includes a mirror driving device described above; and the optical scanning device.

According to still another aspect of the embodiments of the present invention, a mirror driving method that includes computing a correlation value between a detection signal having a ringing component included in oscillation of a mirror, and a periodic signal having a frequency identical to or near a ringing frequency of the ringing component; and adjusting an amplitude of a superimposing waveform that is superimposed to a sawtooth driving waveform that oscillates the mirror, to reduce the ringing component, based on the correlation value.

Other objects and further features of the present invention will be apparent from the following detailed description when read in conjunction with the accompanying drawings.

DESCRIPTION OF THE PREFERRED EMBODIMENTS

Figure 1:
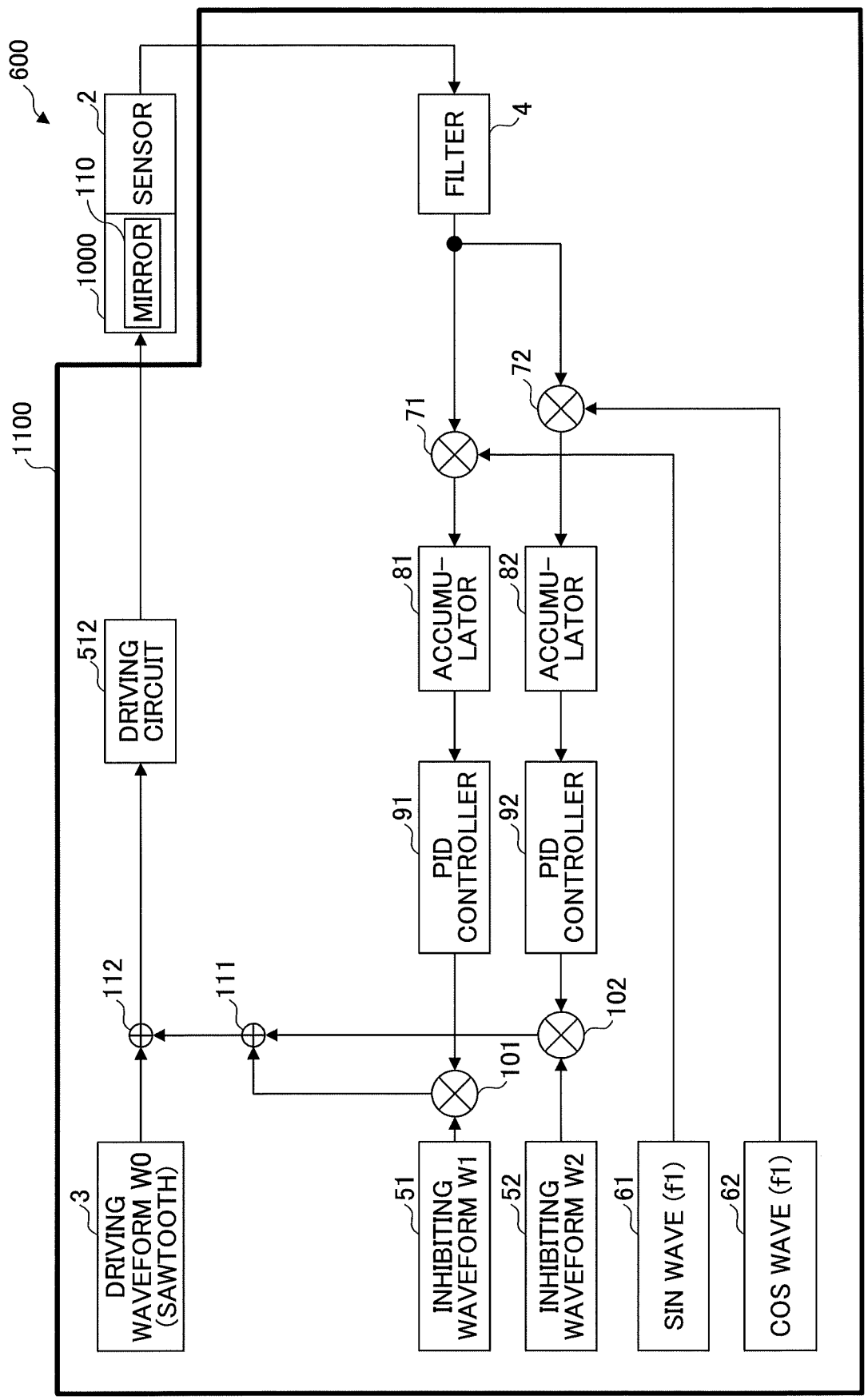
FIG. 1 is a block diagram illustrating an example of a structure of an optical scan control apparatus including a mirror driving device in a first embodiment.

Embodiments of a mirror driving device, an optical scan control apparatus, and a mirror driving method according to the present invention will be described, by referring to the drawings. In the drawings, those parts that are the same are designated by the same reference numerals, and a repeated description of the same parts may be omitted.

FIG. 1 is a block diagram illustrating an example of a structure of an optical scan control apparatus 600 including a mirror driving device 1100 in a first embodiment. The optical scan control apparatus 600 includes the mirror driving device 1100, and an optical scanning device 1000. The mirror driving device 1100 drives the optical scanning device 1000 having a mirror 110, by a sawtooth (or triangular) driving voltage waveform. Details of the structure of the mirror driving device 1100 will be described later in the specification.

Figure 2:
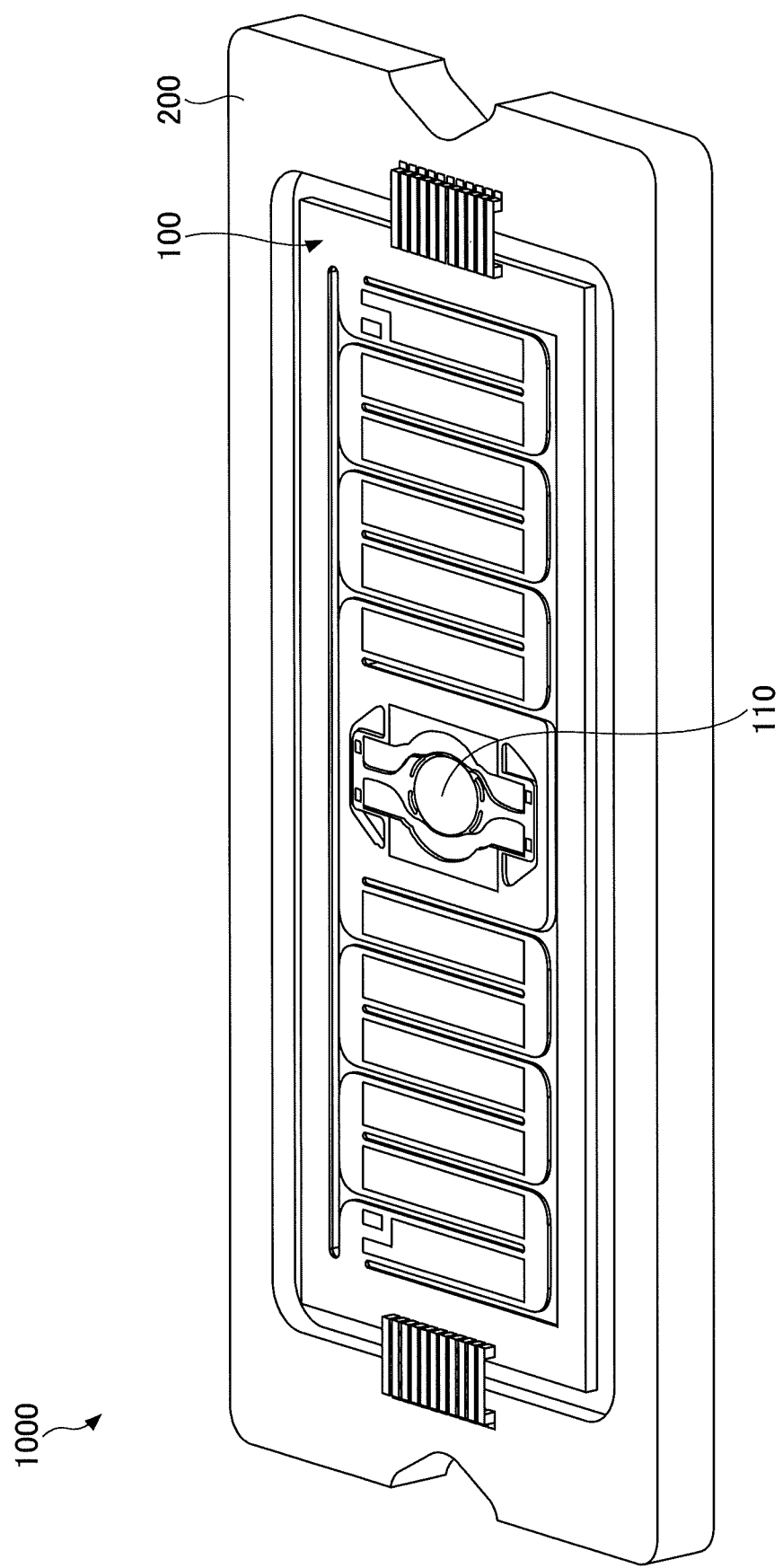
FIG. 2 is a perspective view illustrating an example of an optical scanning device in the first embodiment.
Figure 3:
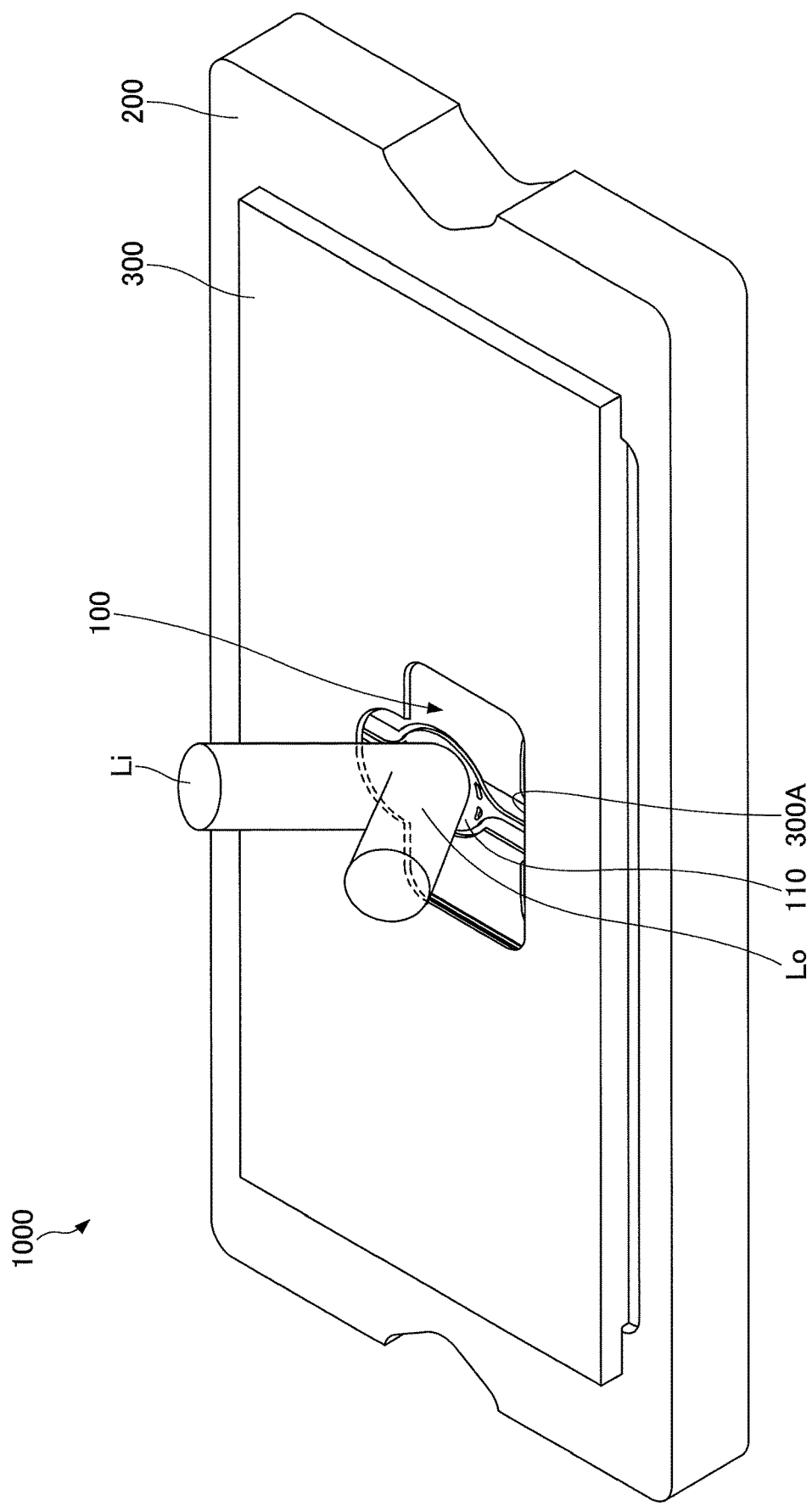
FIG. 3 is a perspective view illustrating the example of the optical scanning device in the first embodiment.

FIG. 2 and FIG. 3 are perspective views illustrating an example of the optical scanning device 1000 in the first embodiment. FIG. 2 illustrates the optical scanning device 1000 in a state in which a package cover is removed, and FIG. 3 illustrates the optical scanning device 1000 in a state in which the package cover is mounted thereon.

As illustrated in FIG. 2 and FIG. 3, the optical scanning device 1000 includes an optical scan part 100, a ceramic package 200 mounted with the optical scan part 100, and a package cover 300 that is arranged on the ceramic package 200 to cover the optical scan part 100. The optical scanning device 1000 may include a substrate, a control circuit, or the like provided underneath the ceramic package 200, on an opposite side from the optical scan part 100.

In the optical scanning device 1000, an opening 300A is provided at an approximate center part of the package cover 300, to expose a vicinity of a mirror 110 having a light reflection surface. The opening 300A has a shape that does not block or interfere with an incoming laser beam Li to the mirror 110 and an outgoing laser beam (or scanning light beam) Lo from the mirror 110.

A first side of the opening 300A where the incoming laser beam Li passes through is formed narrower than a second side of the opening 300A where the outgoing laser beam Lo passes through. In other words, the first side of the opening 300A where the incoming laser beam Li passes through has an approximate semi-circular shape that forms a narrow opening, while the second side of the opening 300A where the outgoing laser beam Lo passes through has an approximately rectangular shape that forms a wide opening. The incoming laser beam Li is incident to the mirror 110 from a predetermined direction, and for this reason, the opening 300A only needs to be open to pass through the incoming laser beam Li from the predetermined direction. On the other hand, because the outgoing laser beam Lo reflected from the mirror 110 performs a two-dimensional scan, the opening 300A needs to be open to pass through the outgoing laser beam Lo in the entire range of the two-dimensional scan.

Figure 4:
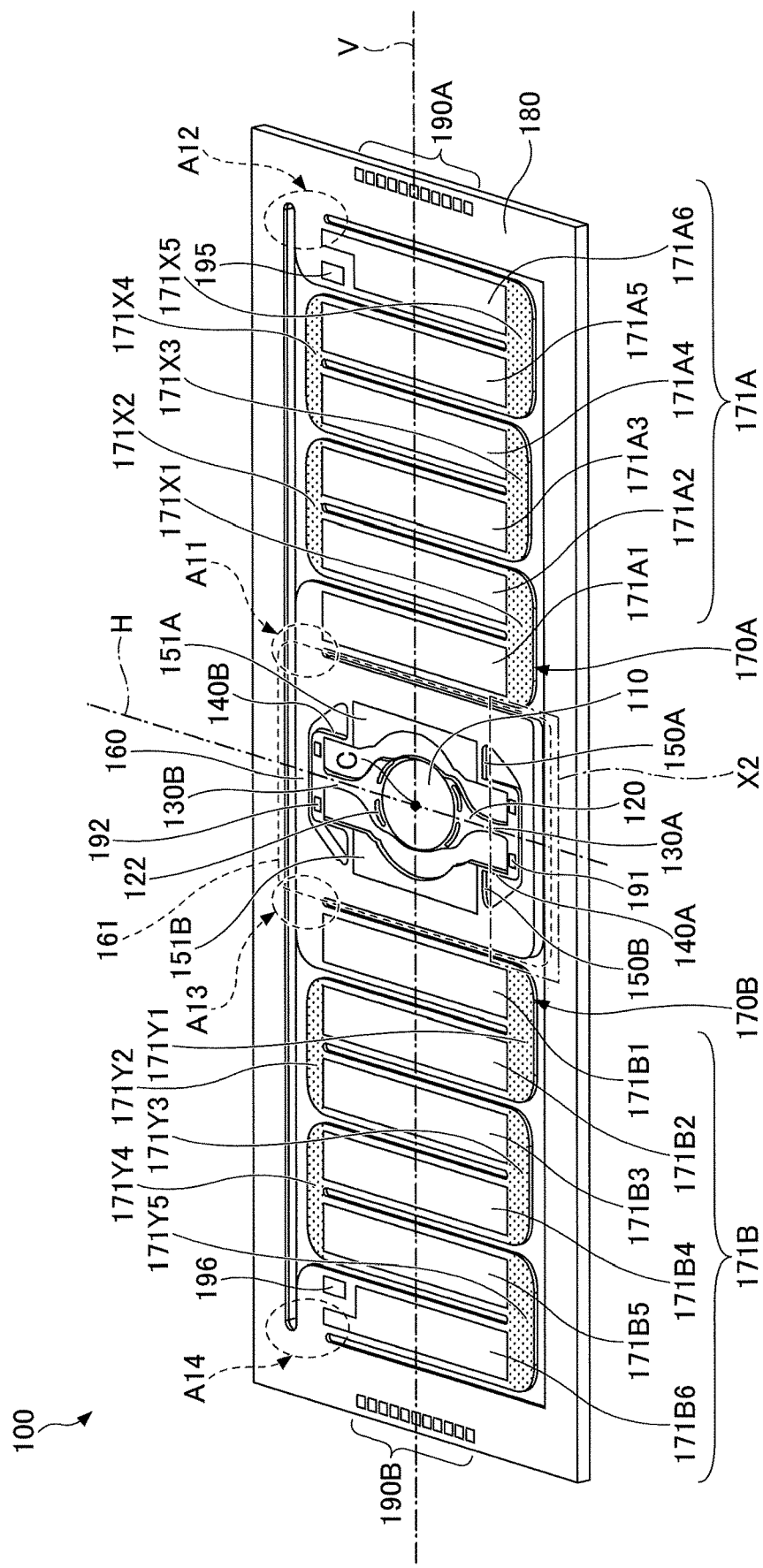
FIG. 4 is a perspective view, viewed from a top, illustrating an example of an optical scan part of the optical scanning device in the first embodiment.

Next, the optical scan part 100 of the optical scanning device 1000 will be described. FIG. 4 is a perspective view, viewed from a top, illustrating an example of the optical scan part 100 of the optical scanning device 1000 in the first embodiment.

As illustrated in FIG. 4, the optical scan part 100 oscillates the mirror 110 to cause the incoming laser beam emitted from a light source to perform the scan. The mirror 110 may be a Micro Electro Mechanical Systems (MEMS) mirror or the like, driven and oscillated by a piezoelectric element, for example.

The optical scan part 100 includes the mirror 110, a mirror support 120, torsion beams 130A and 130B, connection beams 140A and 140B, horizontal driving beams 150A and 150B, a movable frame 160, vertical driving beams 170A and 170B, and a fixed frame 180. The mirror 110 is supported on an upper surface of the mirror support 120. In this embodiment, a combination of the mirror support 120, the torsion beams 130A and 130B, the connection beams 140A and 140B, the horizontal driving beams 150A and 150B, and the movable frame 160 may be referred to as a mirror support body 161 that supports the mirror 110.

The pair of vertical driving beams 170A and 170B, that connect to the mirror support body 161, is arranged on both sides of the mirror support body 161. The mirror support body 161 and the vertical driving beam 170A are connected via a mirror support body connecting part A11. The fixed frame 180 and the vertical driving beam 170A are connected via a fixed frame connecting part A12. The mirror support body 161 and the vertical driving beam 170B are connected via a mirror support body connecting part A13. The fixed frame 180 and the vertical driving beam 170B are connected via a fixed frame connecting part A14. Details of the vertical driving beams 170A and 170B will be described later in the specification.

In addition, the pair of horizontal driving beams 150A and 150B, that connect to the mirror support 120, are arranged on both sides of the mirror support 120 that supports the mirror 110. The horizontal driving beams 150A and 150B, the connection beams 140A and 140B, the torsion beams 130A and 130B, the mirror support 120, and the mirror 110 are supported from the outside by the movable frame 160. In other words, one end of each of the horizontal driving beams 150A and 150B is connected to an inner periphery of the movable frame 160 and supported thereby. The other end of the horizontal driving beam 150A extends towards an inner peripheral side and connects to the connection beams 140A and 140B. The other end of the horizontal driving beam 150B similarly extends towards the inner peripheral side and connects to the connection beams 140A and 140B. The connection beams 140A and 140B are connected to the torsion beams 130A and 130B that extend in a direction of a horizontal rotation axis H, and the torsion beams 130A and 130B supports the mirror support 120 from both sides along the direction of the horizontal rotation axis H. As described above, the horizontal driving beams 150A and 150B are provided to form a pair sandwiching the mirror 110 and the mirror support 120, along a direction perpendicular to the direction of the horizontal rotation axis H in which the torsion beams 130A and 130B extend. The direction of the horizontal rotation axis H will be described later in the specification.

The horizontal driving beams 150A and 150B include horizontal driving sources 151A and 151B, respectively. In addition, the vertical driving beams 170A and 170B include vertical driving sources 171A and 171B, respectively. The horizontal driving beams 150A and 150B and the vertical driving beams 170A and 170B oscillate in up and down directions and in right and left direction, to function as an example of an actuator that causes the laser beam to scan.

The horizontal driving sources 151A and 151B are formed on upper surfaces of the horizontal driving beams 150A and 150B, respectively. The horizontal driving source 151A includes an upper electrode formed on a thin film of a piezoelectric element (hereinafter also referred to as a "piezoelectric thin film") on the upper surface of the horizontal driving beam 150A, and a lower electrode formed on a lower surface of this piezoelectric thin film. The horizontal driving source 151B includes an upper electrode formed on a piezoelectric thin film on the upper surface of the horizontal driving beam 150B, and a lower electrode formed on a lower surface of this piezoelectric thin film. Each of the horizontal driving sources 151A and 151B expands and contracts according to a polarity of a driving voltage applied across the upper electrode and the lower electrode thereof.

For this reason, when driving voltages having waveforms (for example, sine waves) having mutually inverted phases are applied to the horizontal driving source 151A and the horizontal driving source 151B, the horizontal driving beam 150A and the horizontal driving beam 150B oscillate in mutually opposite, up and down directions, on both the left side and the right side of the mirror 110. Hence, the mirror 110 can be oscillated around the horizontal rotation axis H, using the torsion beams 130A and 130B as an oscillation axis or a rotation axis. A direction in which the mirror 110 oscillates around axes of the torsion beams 130A and 130B will be referred to as a horizontal direction, and the above described oscillation axis passing through a center C of a light reflection surface of the mirror 110 will be referred to as the horizontal rotation axis H. For example, resonant oscillation may be used for the horizontal drive by the horizontal driving beams 150A and 150B, and the mirror 110 can be driven and oscillated at a high speed.

A slit 122 is formed in the mirror support 120 along a circumference of the mirror 110. The slit 122 can reduce the weight of the mirror support 120, and at the same time, can transmit torsions of the torsion beams 130A and 130B to the mirror 110.

In addition, the vertical driving beam 170A includes a plurality of rectangular vertical beams extending along the direction of the horizontal rotation axis H. End parts of adjacent vertical beams are connected, to form a zigzag (cornice) shape as a whole.

For example, when counted from the side of the mirror support body 161, the end part of the first vertical beam and the end part of the second vertical beam are connected via a folded part 171X1. In addition, the end part of the second vertical beam and the end part of the third vertical beam are connected via a folded part 171X2. The end part of the third vertical beam and the fourth vertical beam are connected via a folded part 171X3. Further, the end part of the fourth vertical beam and the end part of the fifth vertical beam are connected via a folded part 171X4. The end part of the fifth vertical beam and the end part of the sixth vertical beam are connected via a folded part 171X5. In FIG. 4, each folded part of the vertical driving beam 170A is illustrated by a dot pattern for the sake of convenience.

Similarly, the vertical driving beam 170B includes a plurality of rectangular vertical beams extending along the direction of the horizontal rotation axis H. End parts of adjacent vertical beams are connected, to form a zigzag (cornice) shape as a whole.

For example, when counted from the side of the mirror support body 161, the end part of the first vertical beam and the end part of the second vertical beam are connected via a folded part 171Y1. In addition, the end part of the second vertical beam and the end part of the third vertical beam are connected via a folded part 171Y2. The end part of the third vertical beam and the fourth vertical beam are connected via a folded part 171Y3. Further, the end part of the fourth vertical beam and the end part of the fifth vertical beam are connected via a folded part 171Y4. The end part of the fifth vertical beam and the end part of the sixth vertical beam are connected via a folded part 171Y5. In FIG. 4, each folded part of the vertical driving beam 170B is illustrated by a dot pattern for the sake of convenience.

The vertical driving source 171A is formed on the upper surface of the vertical driving beam 170A, for each vertical beam that is a rectangular unit including no curved part. The vertical driving source 171A includes six vertical driving sources 171A1, 171A2, 171A3, 171A4, 171A5, and 171A6 that are respectively formed on the first through sixth vertical beams forming the vertical driving beam 170A. The vertical driving source 171B is formed on the upper surface of the vertical driving beam 170B, for each vertical beam that is a rectangular unit including no curved part. The vertical driving source 171B includes six vertical driving sources 171B1, 171B2, 171B3, 171B4, 171B5, and 171B6 that are respectively formed on the first through sixth vertical beams forming the vertical driving beam 170B. The vertical driving source 171A includes an upper electrode formed on a piezoelectric thin film on the upper surface of the vertical driving beam 170A, and a lower electrode formed on a lower surface of this piezoelectric thin film. The vertical driving source 171B includes an upper electrode formed on a piezoelectric thin film on the upper surface of the vertical driving beam 170B, and a lower electrode formed on a lower surface of this piezoelectric thin film.

The vertical driving beam 170A applies driving voltages having waveforms that are mutually inverted in up and down directions with reference to a center value of the driving waveform, to the adjacent vertical driving sources 171A for each of the vertical beams, to vary an amount of deformation of each vertical beam in the up direction, and transmit an accumulation of up and down movements of each vertical beam to the movable frame 160. At the same time, the vertical driving beam 170B applies driving voltages having waveforms that are mutually inverted in the up and down directions with reference to the center value of the driving waveform, to the adjacent vertical driving sources 171B for each of the vertical beams, to vary an amount of deformation of each vertical beam in the up direction, and transmit an accumulation of up and down movements of each vertical beam to the movable frame 160. The driving voltages having the waveforms that are mutually inverted in the up and down directions with reference to the center value of the driving waveform may be a sawtooth driving voltage waveform, for example. By such operations of the vertical driving beams 170A and 170B, the mirror 110 and the mirror support body 161 are oscillated in the direction perpendicular to the direction of the horizontal rotation axis H, and this oscillation direction will be referred to as a vertical direction. In addition, the above described oscillation axis passing through the center C of the light reflection surface of the mirror 110 will be referred to as a vertical rotation axis V. For example, nonresonant oscillation may be used for the vertical drive by the vertical driving beams 170A and 170B.

For example, the vertical driving sources 171A1, 171B1, 171A3, 171B3, 171A5, and 171B5 are driven by the same first waveform. On the other hand, the vertical driving sources 171A2, 171B2, 171A4, 171B4, and 171A6, and 171B6 are driven by a second waveform that is inverted with respect to the first waveform in the up and down directions with reference to the center value of the driving waveform. Hence, the mirror 110 and the mirror support body 161 can be oscillated in the vertical direction.

Driving wirings that apply the driving voltage to the upper electrode and the lower electrode of the horizontal driving source 151A are connected to predetermined terminals included in a terminal group 190 that is provided on the fixed frame 180. Driving wirings that apply the driving voltage to the upper electrode and the lower electrode of the horizontal driving source 151B are connected to predetermined terminals included in a terminal group 190B that is provided on the fixed frame 180. In addition, driving wirings that apply the driving voltage to the upper electrode and the lower electrode of the vertical driving source 171A are connected to predetermined terminals included in the terminal group 190A that is provided on the fixed frame 180. Driving wirings that apply the driving voltage to the upper electrode and the lower electrode of the vertical driving source 171B are connected to predetermined terminals included in the terminal group 190B that is provided on the fixed frame 180.

In addition, the optical scan part 100 includes piezoelectric sensors 191 and 192, as horizontal oscillation angle sensors that detect an inclination of the mirror 110 in the horizontal direction (that is, an oscillation angle in the horizontal direction) in a state in which the driving voltages are applied to the horizontal driving sources 151A and 151B and the mirror 110 oscillates in the horizontal direction. The piezoelectric sensor 191 is provided on the connection beam 140A, and the piezoelectric sensor 192 is provided on the connection beam 140B.

Further, the optical scan part 100 includes piezoelectric sensors 195 and 196, as vertical oscillation angle sensors that detect an inclination of the mirror 110 in the vertical direction (that is, an oscillation angle in the vertical direction) in a state in which the driving voltages are applied to the vertical driving sources 171A and 171B and the mirror 110 oscillates in the vertical direction. The piezoelectric sensor 195 is provided on one of the vertical beams forming the vertical diving beam 170A, and the piezoelectric sensor 196 is provided on one of the vertical beams forming the vertical driving beam 170B.

The piezoelectric sensor 191 outputs a current value corresponding to a displacement of the connection beam 140A transmitted from the torsion beam 130A, according to the inclination of the mirror 110 in the horizontal direction. The piezoelectric sensor 192 outputs a current value corresponding to a displacement of the connection beam 140B transmitted from the torsion beam 130B, according to the inclination of the mirror 110 in the horizontal direction. The piezoelectric sensor 195 outputs a current value corresponding to a displacement of the vertical beam of the vertical driving beam 170A, on which the piezoelectric sensor 195 is provided, according to the inclination of mirror 110 in the vertical direction. The piezoelectric sensor 196 outputs a current value corresponding to a displacement of the vertical beam of the vertical driving beam 170B, on which the piezoelectric sensor 196 is provided, according to the inclination of the mirror 110 in the vertical direction.

In the first embodiment, the inclination of the mirror 110 in the horizontal direction is detected using outputs of the piezoelectric sensors 191 and 192, and the inclination of the mirror 110 in the vertical direction is detected using outputs of the piezoelectric sensors 195 and 196. An inclination detector, that detects the inclination of the mirror 110 from the current values output from the piezoelectric sensors 191, 192, 195, and 196, may be provided externally to the optical scan part 100. In addition, a drive controller, that controls the driving voltages supplied to the horizontal driving sources 151A and 151B and the vertical driving sources 171A and 171B based on a detection result of the inclination detector, may be provided externally to the optical scan part 100.

Each of the piezoelectric sensors 191, 192, 195, and 196 includes a piezoelectric thin film, an upper electrode formed on the piezoelectric thin film, and a lower electrode formed on a lower surface of the piezoelectric thin film. In the first embodiment, the output of each piezoelectric sensor has a current value of a sensor wiring connected to the upper electrode and the lower electrode thereof.

The sensor wirings drawn out from the upper electrode and the lower electrode of the piezoelectric sensor 191 are connected to predetermined terminals included in the terminal group 190B that is provided on the fixed frame 180. The sensor wirings drawn out from the upper electrode and the lower electrode of the piezoelectric sensor 195 are connected to predetermined terminals included in the terminal group 190A that is provided on the fixed frame 180. In addition, the sensor wirings drawn out from the upper electrode and the lower electrode of the piezoelectric sensor 192 are connected to predetermined terminals included in the terminal group 190B that is provided on the fixed frame 180. The sensor wirings drawn out from the upper electrode and the lower electrode of the piezoelectric sensor 196 are connected to predetermined terminals included in the terminal group 190B that is provided on the fixed frame 180.

The optical scan part 100 may be formed using a Silicon On Insulator (SOI) substrate including a support layer, a Buried Oxide (BOX) layer, and an active layer, for example. For example, the movable frame 160, ribs provided on back surfaces of the horizontal driving beams 150A and 150B, ribs provided on back surfaces of the vertical driving beams 170A and 170B, or the like are members formed by patterning the support layer. In addition, the horizontal driving beams 150A and 150B, the vertical driving beams 170A and 170B, or the like are members formed by patterning the active layer and the BOX layer, or formed by patterning the active layer.

Figure 5:
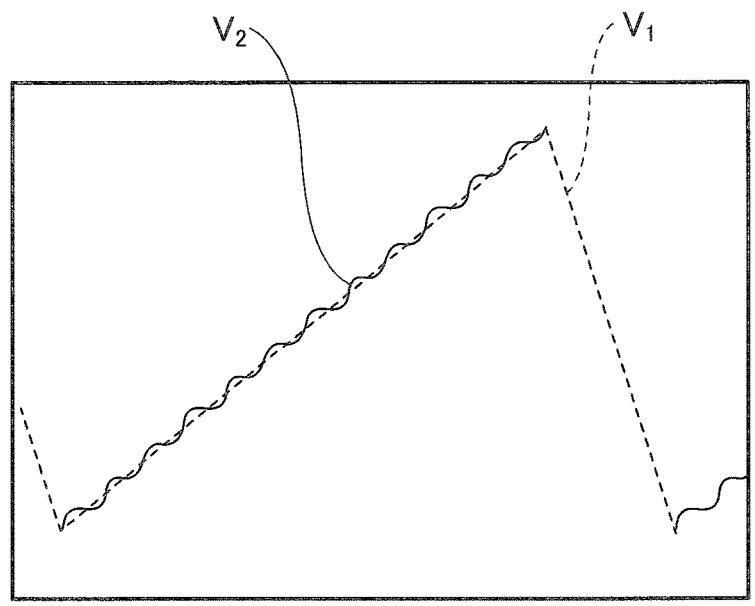
FIG. 5 is a diagram for explaining a relationship between a driving voltage waveform applied to a driving source, and an operation waveform of a mirror.
Figure 6:
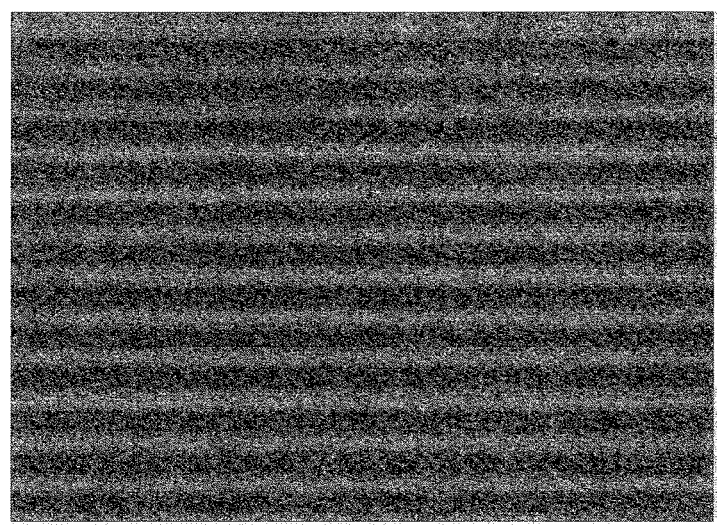
FIG. 6 is a diagram for explaining a state in which an image is displayed using the optical scanning device.

Next, an operation of the optical scanning device 1000 will be described. FIG. 5 is a diagram for explaining a relationship between the driving voltage waveform applied to the vertical driving sources 171A and 171B, and an operation waveform of the mirror 110. In FIG. 5, a dotted line indicates a driving voltage waveform $V_1$, and a solid line indicates a mirror operation waveform $V_2$. In the driving voltage waveform $V_1$ illustrated in FIG. 5, between a rise period in which the signal level rises and a fall period in which the signal level falls, the rise period having the longer time width corresponds to an imaging period used for the image display, and the fall period having the shorter time width corresponds to a non-imaging period not used for the image display. FIG. 6 is a diagram for explaining a state in which an image is displayed using the optical scanning device 1000.

As illustrated in FIG. 5, for example, the voltage having the sawtooth waveform is applied to the vertical driving sources 171A and 171B. Hence, compared to a case in which a voltage having a sine waveform, for example, is applied to the vertical driving sources 171A and 171B, it is possible to increase a section (or region) in which an optical scan velocity of the mirror 110 becomes constant.

When the mirror 110 is driven using the driving voltage waveform $V_1$ illustrated in FIG. 5 as the sawtooth waveform to be applied to the vertical driving sources 171A and 171B, the mirror operation waveform $V_2$ of the mirror 110 may oscillate, to generate the so-called ringing. When the ringing is generated and the optical scanning device 1000 is used to display an image, horizontal stripes are generated as illustrated in FIG. 6, for example, and an image quality deteriorates.

Accordingly, the mirror driving device 1100 in this embodiment generates a sawtooth driving waveform that can reduce the ringing.

Next, details of the structure of the optical scan control apparatus 600 including the mirror driving device 1100 will be described, by referring to FIG. 1. The optical scan control apparatus 600 includes the mirror driving device 1100, the optical scanning device 1000, and a sensor part 2.

The optical scanning device 1000 includes the mirror 110 that is driven to undergo the nonresonant oscillation around the vertical rotation axis V according to the sawtooth driving voltage waveform.

Figure 8A:
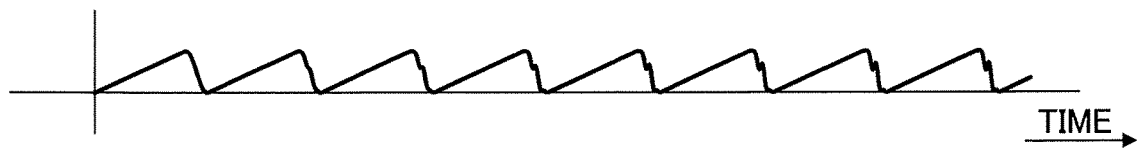
FIG. 8A, FIG. 8B, FIG. 8C, FIG. 8D, FIG. 8E, and FIG. 8F are diagrams illustrating examples of the operation waveforms at various parts of the mirror driving device.
Figure 8B:
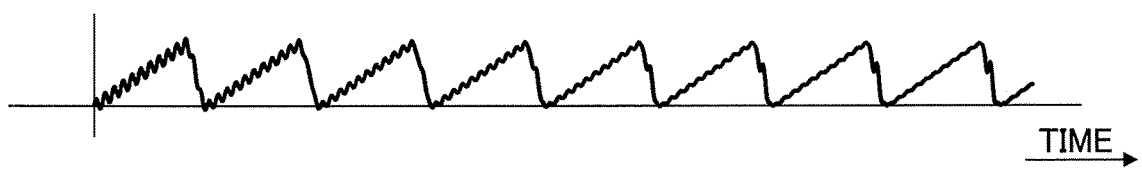
Figure 8C:
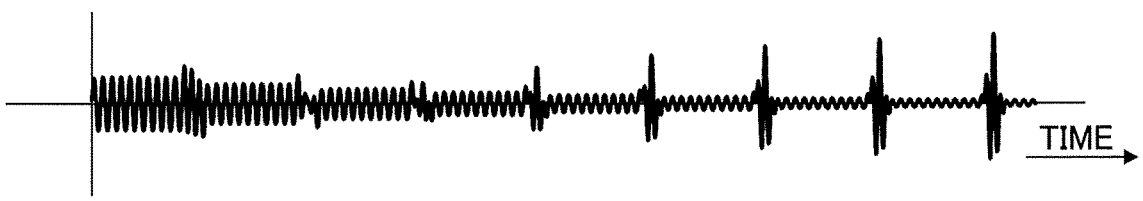

The sensor part 2 includes the piezoelectric sensors 195 and 196 described above, that can detect at least a ringing component f1 included in the oscillation of the mirror 110 around the vertical rotation axis V. The ringing component f1 refers to a frequency component that is superimposed to the mirror operation waveform $V_2$, as illustrated in FIG. 5. The sensor part 2 detects the oscillation (typically, an oscillation angle) of the mirror 110 around the vertical rotation axis V, and outputs a sensor signal indicting a detection value, as illustrated in FIG. 8B which will be described later.

The mirror driving device 1100 analyzes the ringing component f1 included in the sensor signal that indicates the oscillation angle of the mirror 110. The mirror driving device 1100 includes a ringing inhibiting control function that adjusts the shape of the sawtooth driving waveform that oscillates the mirror 110, so as to reduce the ringing component f1, based on an analysis result of the ringing component f1. In the following description, the sawtooth driving waveform that oscillates the mirror 110 may also be referred to as a "driving waveform W0". In this embodiment, the mirror driving device 1100 analyzes an amplitude and a phase of the ringing component f1.

For example, the mirror driving device 1100 obtains a correlation between a sine wave signal having a frequency identical to or near the frequency (or ringing frequency) of the ringing component f1, and a detection signal having the ringing component f1 extracted from the sensor signal. Furthermore, the mirror driving device 1100 obtains a correlation between a cosine wave signal having a phase that is shifted by 90° with respect to the phase of the sine wave signal, and the detection signal having the ringing component f1 extracted from the sensor signal. The mirror driving device 1100 can analyze the amplitude and the phase of the ringing component f1, by obtaining the correlation between the sine wave signal and the detection signal, and obtaining the correlation between the cosine wave signal and the detection signal.

In addition, the mirror driving device 1100 computes a first correlation value indicating the degree of the obtained correlation between the sine wave signal and the detection signal, and computes a second correlation value indicating the degree of the obtained correlation between the cosine wave signal and the detection signal. The mirror driving device 1100 adjusts the amplitude of an inhibiting waveform W1 to be superimposed to the non-imaging period of the driving waveform W0, and adjusts the amplitude of an inhibiting waveform W2 to be superimposed to the non-imaging period of the driving waveform W0, so as to reduce the ringing component f1. In other words, the mirror driving device 1100 performs a feedback control to adjust the amplitude of the inhibiting waveform W1 according to the first correlation value, and to adjust the amplitude of the inhibiting waveform W2 according to the second correlation value, so as to reduce the ringing component f1. By performing such a feedback control, it is possible to quickly reduce the ringing component f1.

Next, an example of the structure of the mirror driving device 1100, that can perform the feedback control described above, will be described. The mirror driving device 1100 includes a driving waveform generator 3, a filter 4, inhibiting waveform generators 51 and 52, a sine wave signal generator 61, a cosine wave signal generator 62, multipliers 71 and 72, accumulators 81 and 82, controllers 91 and 92, multipliers 101 and 102, adders 111 and 112, and a driving part 512.

The driving waveform generator 3 generates the sawtooth driving waveform (or diving waveform signal) that oscillates the mirror 110 around the vertical rotation axis V to a desired oscillation angle. It is desirable that a frequency component, identical to or near the ringing component f1, is reduced or eliminated from the driving waveform that is generated from the driving waveform generator 3.

Figure 7A:
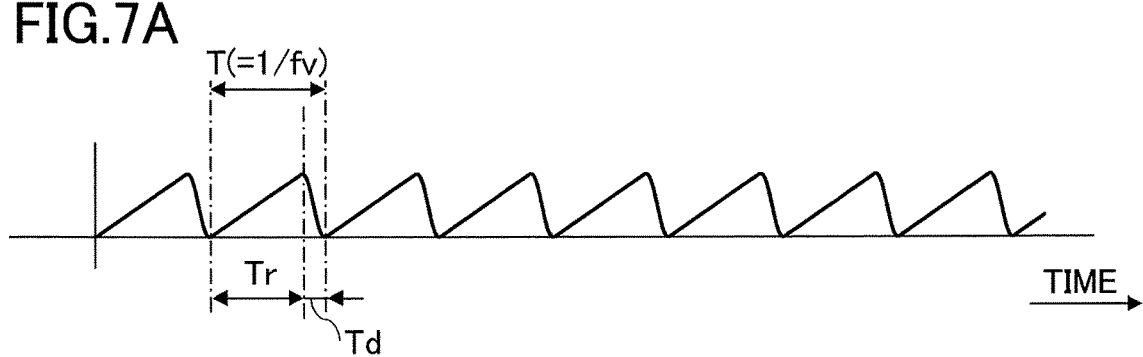
FIG. 7A, FIG. 7B, FIG. 7C, FIG. 7D, FIG. 7E, and FIG. 7F are diagrams illustrating examples of operation waveforms at various parts of the mirror driving device.

FIG. 7A, FIG. 7B, FIG. 7C, FIG. 7D, FIG. 7E, and FIG. 7F are diagrams illustrating examples of operation waveforms at various parts of the mirror driving device 1100. FIG. 7A illustrates an example of the sawtooth driving waveform generated by the driving waveform generator 3. The sawtooth driving waveform generated by the driving waveform generator 3 has a rise period Tr in which the signal level rises, and a fall period Td in which the signal level falls, as illustrated in FIG. 7A. The sawtooth driving waveform is a periodic signal having a driving frequency (inverse number of a driving period T) fv. The rise period Tr indicates a period in which the signal level linearly increases from a minimum value to a maximum value of an amplitude of the driving waveform. The fall period Td indicates a period in which the signal level linearly decreases from the maximum value to the minimum value of the amplitude of the driving waveform. The driving waveform generator 3 generates the sawtooth driving waveform so that a time width (or length) of one of the rise period Tr and the fall period Td becomes shorter than the other of the rise period Tr and the fall period Td. FIG. 7A illustrates an example in which the time width of the fall period Td is shorter than the time width of the rise period Tr.

When the sawtooth driving waveform is analyzed using Fast Fourier Transform (FFT), the spectrum of the sawtooth driving waveform repeatedly generates frequency points where a frequency component periodically becomes zero on the frequency axis. The frequency (or frequency step) of these frequency points approximately matches the frequency having a period amounting to a length of the shorter one of the time widths of the rise period Tr and the fall period Td (that is, the length of the time width of the fall period Td in the example illustrated in FIG. 7A) of the sawtooth driving waveform. In other words, the frequency of these frequency points approximately matches the frequency that is an integer multiple of an inverse number of the length of the shorter one of the time widths of the rise period Tr and the fall period Td (that is, the length of the time width of the fall period Td in the example illustrated in FIG. 7A) of the sawtooth driving waveform.

Accordingly, when causing the mirror 110 of the optical scanning device 1000 that resonates at the natural resonant frequency f0 to scan with the sawtooth waveform, the resonant frequency component is no longer included in the sawtooth driving waveform if the frequency point where the frequency component becomes zero matches the natural resonant frequency f0. Hence, unwanted resonance is not excited in the oscillation angle toward the vertical side of the mirror 110, the ringing is reduced, and the optical scan velocity can be maintained constant with a high accuracy. In other words, the scan accuracy is improved, and the image quality of the image that is displayed using the optical scanning device 1000 is improved. The natural resonant frequency f0 is a natural frequency (resonant frequency) related to the oscillation around the vertical rotation axis V of the optical scanning device 1000

In addition, the driving waveform generator 3 generates the sawtooth driving waveform so that a frequency of a harmonic component matching an integer multiple of a frequency fv of the sawtooth driving waveform is different from the natural resonant frequency. Consequently, the unwanted resonance is not excited in the oscillation angle toward the vertical side of the mirror 110, the ringing is reduced, and the optical scan velocity can be maintained constant with a high accuracy. In other words, the scan accuracy is improved, and the image quality of the image that is displayed using the optical scanning device 1000 is improved.

Hence, the driving waveform generator 3 selects, as the driving frequency (inverse number of a driving period T) fv at which the optical scanning device 1000 is driven, a frequency that is closest to a desired refresh rate (or frame rate) among frequencies satisfying the following formula, where fv denotes the frequency of the sawtooth driving waveform, f0 denotes the natural frequency (resonant frequency) related to the oscillation around the vertical rotation axis V of the optical scanning device 1000, and n denotes an integer.

$$fv = f0/(\tfrac{1}{2}+n)$$

The refresh rate indicates a frequency of the scan. By computing the frequency fv by dividing the natural resonant frequency f0 by a sum of n and ½, and not simply dividing the natural resonant frequency f0 by n, it is possible to select the frequency fv that is separated as much as possible, frequency-wise, from the natural resonant frequency f0.

The driving waveform generator 3 in this embodiment selects the time width of the fall period Td from time widths (integer multiples of the inverse number of the natural resonant frequency f0) satisfying the following formula, where m denotes an integer.

$$Td=m/f0$$

The driving waveform generator 3 can determine the rise time Tr y subtracting the time width of the fall time Td from the driving period T, that is, from the following formula.

$$Tr=T-Td$$

Accordingly, by driving the optical scanning device 1000 based on the sawtooth driving waveform having the frequency v and the fall period Td that are computed as described above, it is possible to reduce the ringing in a mirror operation waveform $V_2$. A frequency of the driving voltage waveform $V_1$ applied to the vertical driving sources 171A and 171B and the lengths of a fall period and a rise period may be approximately the same as the frequency fv of the driving waveform generated by the driving waveform generator 3 and the lengths of the fall period Td and the rise period Tr.

In FIG. 1, the filter 4 is an example of a detector that outputs a detection signal (hereinafter also referred to as a "detection signal S") having the ringing component f1 included in the oscillation of the mirror 110. For example, the filter 4 filters the sensor signal from the sensor part 2, having the waveform that varies according to the oscillation of the mirror 110, to output the detection signal S having the ringing component f1.

The filter 4 performs a filtering process to reduce components other than the ringing component f1 included in the sensor signal output from the sensor part 2, for example. In order to reduce the components other than the ringing component f1, the filter 4 subjects the sensor signal output from the sensor part 2 to the filtering process using a lowpass filter or a bandstop filter, for example. The lowpass filter attenuates a frequency component higher than a cutoff frequency. The bandstop filter attenuates a frequency component included in a predetermined band.

In a case in which the sensor part 2 is configured to detect only the ringing component f1, the filter 4 does not need to perform the filtering process. In addition, the filter 4 may include an Analog-to-Digital Converter (ADC) that subjects the sensor signal from the sensor part 2 to an Analog-to-Digital (A/D) conversion. In this case, the ADC outputs the detection signal S having the ringing component f1 included in the oscillation of the mirror 110.

Figure 7B:
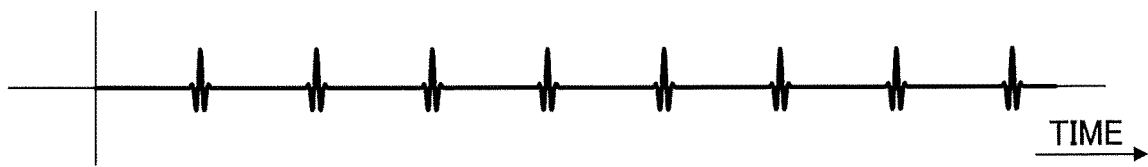
Figure 7C:
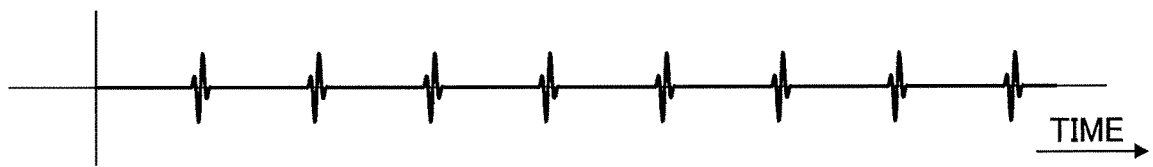

The inhibiting waveform generator 51 is an example of a first superimposing waveform generator that generates the inhibiting waveform W1 to be superimposed to the non-imaging period of the sawtooth driving waveform W0. The inhibiting waveform generator 52 is an example of a second superimposing waveform generator that generates the inhibiting waveform W2 to be superimposed to the non-imaging period of the sawtooth driving waveform W0. In this embodiment, the inhibiting waveforms W1 and W2, respectively illustrated in FIG. 7B and FIG. 7C, are superimposing waveforms that are superimposed to the falling period Td of the sawtooth driving waveform, for the purposes of reducing the ringing component f1, where the time width in which the signal level varies is shorter for the fall period Td than the rise period Tr. Each of the inhibiting waveforms W1 and W2 has a time width shorter than the length of the fall period Td which is the shorter one of the rise period Tr and the fall period Td. In addition, although the inhibiting waveforms W1 and W2 may have arbitrary shapes, the inhibiting waveforms W1 and W2 preferably have shapes having a frequency component identical to or near the natural resonant frequency of the optical scanning device 1000. For example, the inhibiting waveforms W1 and W2 are pulse waveforms having mutually different shapes.

Figure 8D:
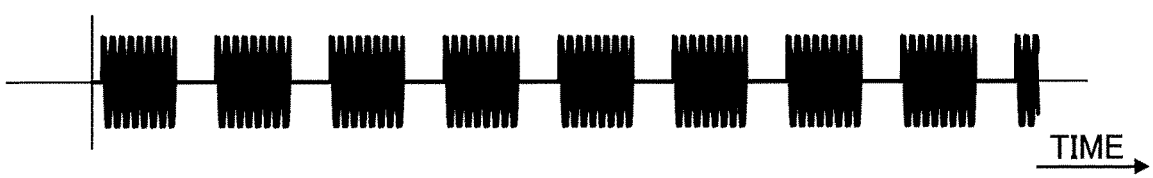

The sine wave signal generator 61 is an example of a first periodic signal generator that generates a sine wave signal (or sine wave (f1)), which is one of periodic signals having a frequency identical to or near the ringing frequency of the ringing component f1. The sine wave signal generator 61 outputs the sine wave (f1) during the imaging period as illustrated in FIG. 8D, so as to analyze the ringing component f1 during the imaging period included in the detection signal S. FIG. 8D illustrates a case in which the sine wave (f1) generated by the sine wave signal generator 61 is output during the rise period Tr of the sawtooth driving waveform, where the time width in which the signal level varies is longer for the rise period Tr than the fall period Td.

The cosine wave signal generator 62 is an example of a second periodic signal generator that generates a cosine wave signal (or cosine wave (f1)), which is one of the periodic signals having the frequency identical to or near the ringing frequency of the ringing component f1. The phase of the cosine wave (f1) is shifted by 90° with respect to the phase of the sine wave (f1). The cosine wave signal generator 62 outputs the cosine wave (f1) during the imaging period as illustrated in FIG. 8D, so as to analyze the ringing component f1 during the imaging period included in the detection signal S. FIG. 8D illustrates a case in which the cosine wave (f1) generated by the cosine wave signal generator 62 is output during the rise period Tr of the sawtooth driving waveform, where the time width in which the signal level varies is longer for the rise period Tr than the fall period Td.

The multiplier 71 computes and outputs a product of the sine wave (f1) and the detection signal S. The multiplier 72 computes and outputs a product of the cosine wave (f1) and the detection signal S.

Figure 8E:
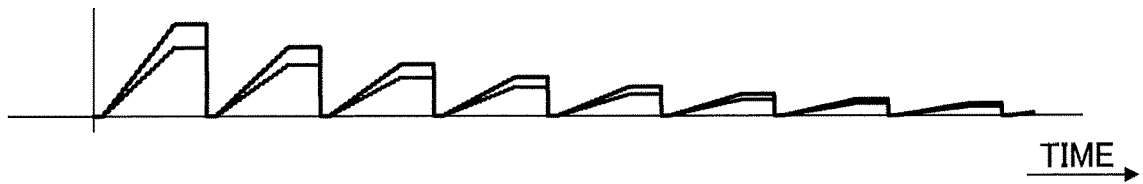

The accumulator 81 is an example of a first accumulator, that accumulates the products output from the multiplier 71 and outputs the accumulated value as the first correlation value. The accumulator 82 is an example of a second accumulator, that accumulates the products output from the multiplier 72 and outputs the accumulated value as the second correlation value. Each of the accumulated values computed in the accumulators 81 and 82, illustrated in FIG. 8E, is reset for every one driving period T of the sawtooth driving waveform W0.

The first correlation value output from the accumulator 81 is an index value indicating the degree of correlation between the sine wave (f1) and the detection signal S, and corresponds to the accumulated value of the products of the sine wave (f1) and the detection signal S. The second correlation value output from the accumulator 82 is an index value indicating the degree of correlation between the cosine wave (f1) and the detection signal S, and corresponds to the accumulated value of the products of the cosine wave (f1) and the detection signal S.

When both the first correlation value and the second correlation value are less than or equal to a predetermined threshold value Th (are zero, for example), it may be judged that no ringing component f1 exists within the detection signal S, that is, within the mirror operation waveform $V_2$ illustrated in FIG. 5. When at least one of the first correlation value and the second correlation value is greater than the predetermined threshold value Th (is a finite value al greater than zero, for example), it may be judged that the ringing component f1 having a finite amplitude exists within the detection signal S, that is, within the mirror operation waveform $V_2$ illustrated in FIG. 5.

When the first correlation value is greater than the predetermined threshold value Th and the second correlation value is less than or equal to the predetermined threshold value Th (the first correlation value is the finite value al, and the second correlation value is zero, for example), it may be judged that the ringing component f1 having the finite amplitude exists within the detection signal S, and that there is the phase of the ringing component f1 is not shifted.

When the first correlation value is less than or equal to the predetermined threshold value Th and the second correlation value is greater than the predetermined threshold value Th (the first correlation value is zero, and the second correlation value is the finite value al, for example), it may be judged that the ringing component f1 having the finite amplitude exists within the detection signal S, and that the phase of the ringing component f1 is shifted by 90°.

When both the first correlation value and the second correlation value are greater than the predetermined threshold value Th (are the finite value al, for example), it may be judged that the ringing component f1 having the finite amplitude exists within the detection signal S, and that the phase of the ringing component f1 is shifted by a finite amount.

Accordingly, the multiplier 71 and the accumulator 81 function as an example of a first correlation calculator that calculates the first correlation value between the sine wave (f1) and the detection signal S. In addition, the multiplier 72 and the accumulator 82 function as an example of a second correlation calculator that calculates the second correlation value between the cosine wave (f1) and the detection signal S.

Figure 7D:
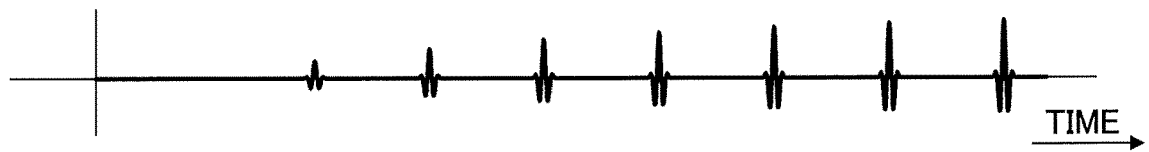
Figure 8F:
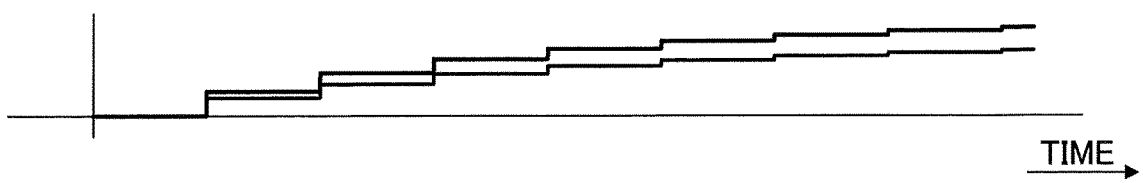

The controller 91 is an example of a first controller that performs a Proportional Integral (PI) control or a Proportional Integral Differential (PID) control that determines the amplitude of the inhibiting waveform W1, based on the first correlation value. The multiplier 101 adjusts the amplitude of the inhibiting waveform W1 according to the output of the controller 91 illustrated in FIG. 8F. The controller 91 adjusts a first gain supplied to the multiplier 101, so as to reduce the first correlation value output from the accumulator 81. The multiplier 101 multiplies the first gain to the inhibiting waveform W1, and outputs a multiplied output illustrated in FIG. 8F. In this embodiment, the controller 91 adjusts the first gain to become larger as the first correlation value for every one driving period T becomes smaller, so as to adjust the amplitude of the inhibiting waveform W1 output from the multiplier 101 to become larger, as illustrated in FIG. 7D.

Figure 7E:
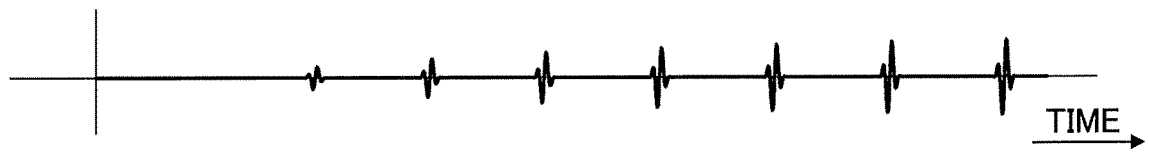

The controller 92 is an example of a second controller that performs a PI control or a PID control that determines the amplitude of the inhibiting waveform W2, based on the second correlation value. The multiplier 102 adjusts the amplitude of the inhibiting waveform W2 according to the output of the controller 92 illustrated in FIG. 8F. The controller 92 adjusts a second gain supplied to the multiplier 102, so as to reduce the second correlation value output from the accumulator 82. The multiplier 102 multiplies a second gain to the inhibiting waveform W2, and outputs a multiplied output illustrated in FIG. 8F. In this embodiment, the controller 92 adjusts the second gain to become larger as the second correlation value for every one driving period T becomes smaller, so as to adjust the amplitude of the inhibiting waveform W2 output from the multiplier 102 to become larger, as illustrated in FIG. 7E.

Figure 7F:
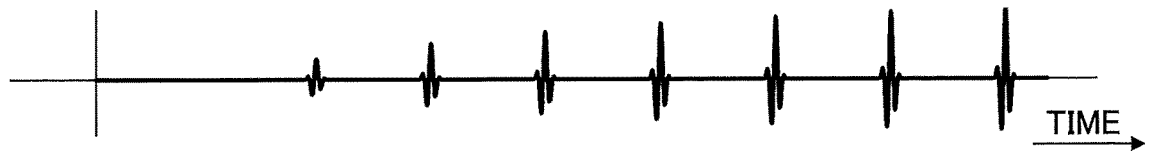

The adder 111 adds the inhibiting waveform W1 output from the multiplier 101 and the inhibiting waveform W2 output from the multiplier 102, and outputs a combined waveform, illustrated in FIG. 7F, of the two inhibiting waveforms W1 and W2 output from the multipliers 101 and 102, respectively. The adder 112 adds the driving waveform W0 generated by the driving waveform generator 3, and the combined waveform output from the adder 111, to superimpose the combined waveform to the driving waveform W0 and correct the driving waveform W0. Accordingly, a corrected driving waveform illustrated in FIG. 8A is output from the adder 112 that corrects the driving waveform W0.

Accordingly, the controllers 91 and 92, the multipliers 101 and 102, and the adders 111 and 112 function as an example of an amplitude adjuster that adjusts the amplitudes of the inhibiting waveforms W1 and W2 to be superimposed to the driving waveform W0, based on the first correlation value and the second correlation value, so as to reduce the ringing component f1.

The mirror driving device 1100 includes a waveform generator including the driving waveform generator 3. This waveform generator generates a driving waveform (or driving waveform signal) that controls the oscillation of the mirror 110, based on the outputs of the piezoelectric sensors 191, 192, 195, and 196 illustrated in FIG. 4, and a synchronizing signal output from a video signal processor (not illustrated) that processes a video signal. The video signal processor performs a process to separate the synchronizing signal included in the input video signal, from a luminance signal and a chromaticity signal included in the input video signal. The waveform generator generates a sinusoidal driving waveform signal for oscillating the mirror 110 in the horizontal direction around the horizontal rotation axis H, and generates a sawtooth driving waveform signal for oscillating the mirror 110 in the vertical direction around the vertical rotation axis V.

The driving part 512 drives the optical scanning device 1000 by the driving voltage waveform corresponding to the driving waveform (or driving waveform signal) generated by the waveform generator. The driving part 512 is an example of a circuit that amplifies each of the sinusoidal and sawtooth driving waveform signals generated by the waveform generator, for example, and drives the optical scanning device 1000 by the amplified sinusoidal and sawtooth driving waveform signals.

The sawtooth driving waveform signal generated by the waveform generator corresponds to the corrected sawtooth driving waveform (corrected driving waveform signal) output from the amplitude adjuster (more particularly, the adder 112).

The driving part 512 applies the sinusoidal driving voltage waveform to the horizontal driving source 151A, and applies to the horizontal driving source 151B a sinusoidal driving voltage waveform having an inverted phase with respect to the sinusoidal driving voltage waveform applied to the horizontal driving source 151A. Hence, the mirror 110 can be oscillated around the horizontal rotation axis H, as the oscillation axis or the rotation axis of the torsion beams 130A and 130B.

On the other hand, the driving part 512 applies the corrected sawtooth driving voltage waveforms having mutually identical phases to each of the vertical driving sources 171A1, 171B1, 171A3, 171B3, 171A5, and 171B5 that are arranged at the odd numbered positions counted from the side of the movable frame 160. At the same time, the driving part 512 applies the corrected sawtooth driving voltage waveforms having mutually identical phases to each of the vertical driving sources 171A2, 171B2, 171A4, 171B4, 171A6, and 171B6 that are arranged at the even numbered positions counted from the side of the movable frame 160. The driving part 512 includes a phase inverter or the like that inverts the phases of the corrected sawtooth driving voltage waveforms applied to the vertical driving sources 171A1 or the like that are arranged at the odd numbered positions, and applies the corrected sawtooth driving voltage waveforms having the inverted phases to the vertical driving sources 171A2 or the like that are arranged at the even numbered positions. Hence, the mirror 110 can be oscillated around the vertical rotation axis V.

Accordingly, in this embodiment, even if the manner in which the ringing appears varies due to characteristic variations in the optical scan part 100 including the mirror 110, the amplitude of the ringing component f1 is controlled to become smaller every time the amplitudes of the inhibiting waveforms are adjusted. For this reason, compared to a case in which a plurality of waveform information are successively applied to the driving part and a sequential algorithm is employed to find waveform adjustment parameters that minimize the amplitude of the ringing, this embodiment can quickly reduce the ringing component f1, as illustrated in FIG. 8B.

In addition, even during the imaging operation, the driving waveform can always be adjusted to the optimum driving waveform even during the imaging operation, because the control is continuously performed so that the optimum driving waveform is always obtained. For example, even if an angle of view (or amplitude of the oscillation angle of the mirror 110) is varied during the imaging operation, the driving waveform can continuously be adjusted to the optimum driving waveform so as to follow the variation in the angle of view.

In addition, even if a Signal-to-Noise Ratio (SNR) of the sensor signal is poor, it is possible to positively reduce the ringing, by narrowing the band by the feedback control using the PI control or the PID control.

In order to accurately perform the feedback control, if is effective to correct each inhibiting waveform according to the following steps (or procedures) S1 through S5 before performing the feedback control.

Step S1 obtains correlation values Asb and Acb respectively output from the accumulators 81 and 82 when the mirror 110 is driven by the driving waveform W0, in a state in which outputs of each of the controllers 91 and 92 is fixed to 0.

Step S2 obtains correlation values As1 and Ac1 respectively output from the accumulators 81 and 82 when the mirror 110 is driven by the driving waveform W0, in a state in which the output of the controller 91 is fixed to Ca and the output of the controller 92 is fixed to 0. Step S3 returns the output of the controller 91 to 0, and switches the output of the controller 92 to an arbitrary value C1. In addition, step S3 obtains correlation values As2 and Ac2 respectively output from the accumulators 81 and 82 when the mirror 110 is driven by the driving waveform W0, in a state in which the output of the controller 91 is fixed to 0, and the output of the controller 92 is fixed to Ca.

Step S4 computes variations Ds1 and Dc1 by subtracting the correlation values Asb and Acb obtained in step S1 from the respective correlation values As1 and Ac1 obtained in step S2. The variation Ds1 indicates a variation of the first correlation value when only the inhibiting waveform W1 before the correction is superimposed to the driving waveform W0. The variation Dc1 indicates a variation of the second correlation value when only the inhibiting waveform W1 before the correction is superimposed to the driving waveform W0. Similarly, step S4 computes variations Ds2 and Dc2 by subtracting the correlation values Asb and Acb obtained in step S1 from the respective correlation values As2 and Ac2 obtained in step S3. The variation Ds2 indicates a variation of the first correlation value when only the inhibiting waveform W2 before the correction is superimposed to the driving waveform W0. The variation Dc2 indicates a variation of the second correlation value when only the inhibiting waveform W2 before the correction is superimposed to the driving waveform W0. The variations Ds1, Dc1, Ds2, and Dc2 may be represented by a matrix D of the following formula (1), where Dc1=Ac1−Acb, Ds1=As1−Asb, Dc2=Ac2−Acb, and Ds2=As2−Asb.

$$D = \begin{pmatrix} Ds1 & Ds2 \\ Dc1 & Dc2 \end{pmatrix} \quad (1)$$

Step S5 obtains an inverse matrix $D^{-1}$ of the matrix D. Each of the inhibiting waveforms W1 and W2 can be corrected by multiplying the inverse matrix $D^{-1}$ to the inhibiting waveform data before the correction, as may be seen from the following formula (2).

$$G \cdot (W1\ W2) \cdot D^{-1} = (W1'\ W2') \quad (2)$$

Corrected inhibiting waveforms W1' and W2' respectively denote the inhibiting waveforms W1 and W2 after the correction. In the formula (2), G denotes a correction term for adapting to the size (number of bits) of a memory that records the waveforms. The data used by the inhibiting waveform generators 61 and 52 to generate the corrected inhibiting waveforms W1' and W2' are recorded in advance in the memory. When performing the feedback control, the inhibiting waveform generators 51 and 52 read the data recorded in advance in the memory, and use the read data to generate the corrected inhibiting waveforms W1' and W2'.

By correcting the inhibiting waveforms in the manner described above, with respect to a change in the amplitude of the inhibiting waveform W1 (output of the controller 91), the second correlation value between the cosine wave (f1) and the detection signal S (output of the accumulator 82) does not change, and only the first correlation value between the sine wave (f1) and the detection signal S (output of the accumulator 81) changes. Similarly, with respect to a change in the amplitude of the inhibiting waveform W2 (output of the controller 92), the first correlation value between the sine wave (f1) and the detection signal S (output of the accumulator 81) does not change, and only the second correlation value between the cosine wave (f1) and the detection signal S (output of the accumulator 82) changes. In other words, it is possible to separate, that is, operate independently, a feedback control system on the side of the controller 91, and a feedback control system on the side of the controller 92. As a result, the feedback control stabilizes, to make it possible to quickly reduce the ringing component f1.

Figure 9:
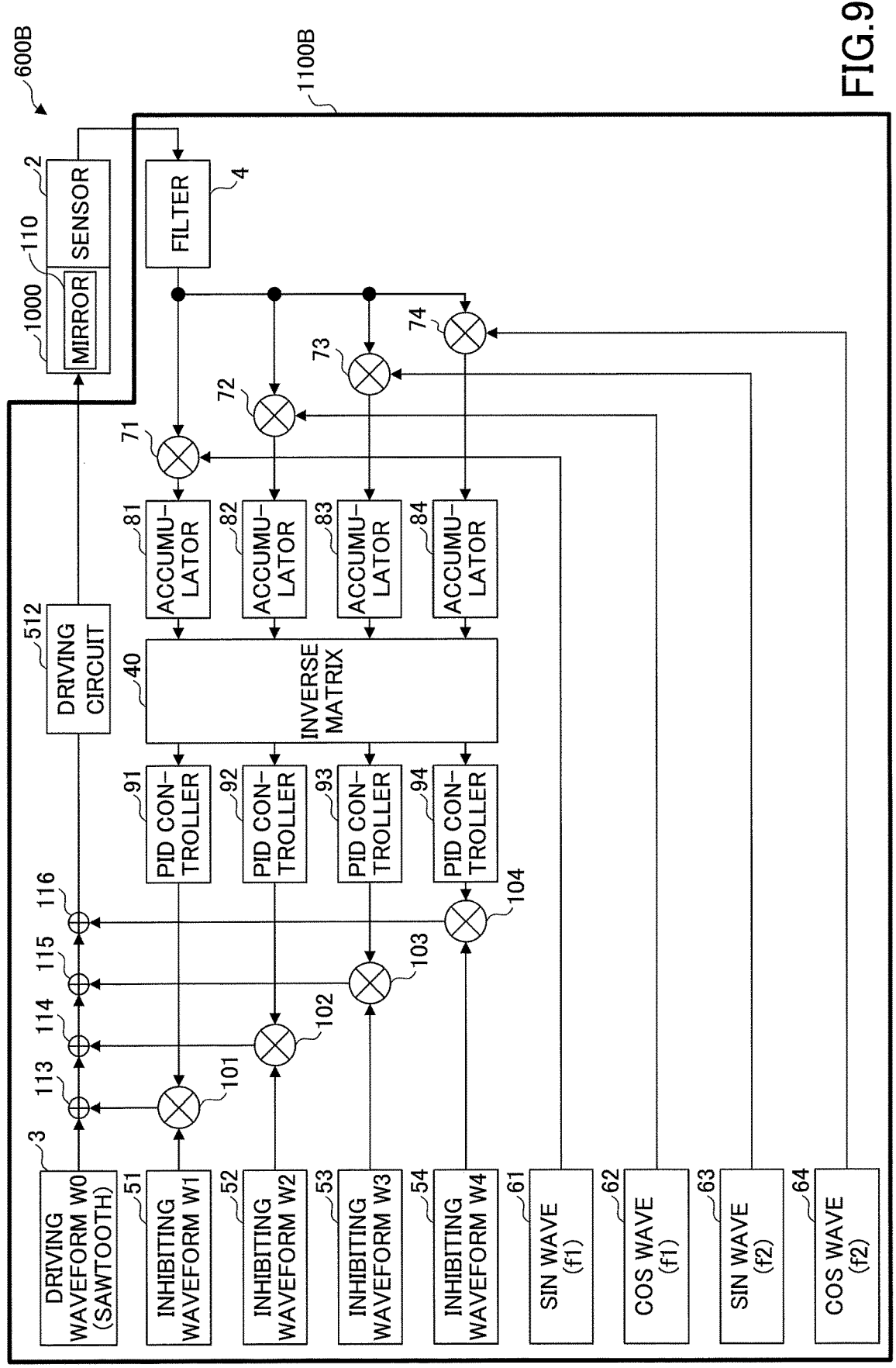
FIG. 9 is a block diagram illustrating an example of the structure of the optical scan control apparatus including the mirror driving device in a second embodiment.

FIG. 9 is a block diagram illustrating an example of the structure of an optical scan control apparatus 600B including a mirror driving device 1100B in a second embodiment. The optical scan control apparatus 600B includes the mirror driving device 1100B, and the optical scanning device 1000. The mirror driving device 1100B drives the optical scanning device 1000 having the mirror 110, by a sawtooth (or triangular) driving voltage waveform. A description of the structure and features including advantageous effects of the second embodiment, that are similar to those of the first embodiment, will be omitted.

In the first embodiment described above, there is only one ringing component to be reduced, however, the number of ringing components to be reduced is not limited to one. When a plurality of ringing components are to be reduced, a number of pairs of control systems, corresponding to the number of ringing components to be reduced, may be provided, where each pair is formed by a control system that adjusts the amplitude of the inhibiting waveform corresponding to the sine wave and a control system that adjusts the amplitude of the inhibiting waveform corresponding to the cosine wave.

FIG. 9 illustrates an example in which two ringing components are to be reduced. The mirror driving device 1100B includes the driving waveform generator 3, the filter 4, inhibiting waveform generators 51 through 54, sine wave signal generators 61 and 63, cosine wave signal generators 62 and 64, multipliers 71 through 74, accumulators 81 through 84, controllers 91 through 94, multipliers 101 through 104, adders 111 through 114, and the driving part 512.

In addition, instead of correcting the inhibiting waveforms using the inverse matrix $D^{-1}$ as in the first embodiment, the mirror driving device 1100B includes a correction circuit 40 that corrects the output of each of the accumulators 81 through 84, indicating the correlation between the cosine or sine wave and the detection signal S, using the inverse matrix $D^{-4}$. When the ringing frequency greatly varies due to an environment in which (for example, temperature at which) the mirror driving device 1100B is used, the independence of the correlation value between the cosine wave and the detection signal S and the correlation value between the sine wave and the detection signal S may deteriorate and cause interference between the control systems on the cosine wave side and the sine wave side, and the convergence speed and stability of the control may deteriorate. However, by providing the correction circuit 40 and adjusting coefficients in the inverse matrix $D^{-1}$ according to the environment, it is possible to maintain the independence of the correlation value between the cosine wave and the detection signal S and the correlation value between the sine wave and the detection signal S, and to improve the convergence speed and stability with which the ringing components can be reduced.

The inhibiting waveform generator 53 is an example of a third superimposing waveform generator that generates an inhibiting waveform W3 to be superimposed to the non-imaging period of the sawtooth driving waveform W0. The inhibiting waveform generator 54 is an example of a fourth superimposing waveform generator that generates an inhibiting waveform W4 to be superimposed to the non-imaging period of the sawtooth driving waveform W0.

The sine wave signal generator 63 is an example of a third periodic signal generator that generates a sine wave signal (or sine wave (f2)), which is one of periodic signals having a frequency identical to or near a ringing frequency of a ringing component f2.

The sine wave signal generator 64 is an example of a fourth periodic signal generator that generates a cosine wave signal (or cosine wave (f2)), which is one of the periodic signals having the frequency identical to or near the ringing frequency of the ringing component f2.

The multiplier 73 computes and outputs a product of the sine wave (f2) and the detection signal S. The multiplier 74 computes and outputs a product of the cosine wave (f2) and the detection signal S.

The accumulator 83 is an example of a third accumulator, that accumulates the products output from the multiplier 73 and outputs the accumulated value as a third correlation value. The accumulator 84 is an example of a fourth accumulator, that accumulates the products output from the multiplier 74 and outputs the accumulated value as a fourth correlation value.

The third correlation value output from the accumulator 83 is an index value indicating the degree of correlation between the sine wave (f2) and the detection signal S, and corresponds to the accumulated value of the products of the sine wave (f2) and the detection signal S. The fourth correlation value output from the accumulator 84 is an index value indicating the degree of correlation between the cosine wave (f2) and the detection signal S, and corresponds to the accumulated value of the products of the cosine wave (f2) and the detection signal S.

Accordingly, the multiplier 73 and the accumulator 83 function as an example of a third correlation calculator that calculates the third correlation value between the sine wave (f2) and the detection signal S. In addition, the multiplier 74 and the accumulator 84 function as an example of a fourth correlation calculator that calculates the fourth correlation value between the cosine wave (f2) and the detection signal S.

The correction circuit 40 multiplies the inverse matrix $D^{-1}$ to the first through fourth correlation values to correct the first through fourth correlation values, and outputs the corrected, first through fourth correlation values.

The controller 91 performs the PI control or the PID control to determine the amplitude of the inhibiting waveform W1. The controller 92 performs the PI control or the PID control to determine the amplitude of the inhibiting waveform W2. The controller 93 performs the PI control or the PID control to determine the amplitude of the inhibiting waveform W3. The controller 94 performs the PI control or the PID control to determine the amplitude of the inhibiting waveform W4. The multiplier 101 adjusts the amplitude of the inhibiting waveform W1 according to the output of the controller 91. The multiplier 102 adjusts the amplitude of the inhibiting waveform W2 according to the output of the controller 92. The multiplier 103 adjusts the amplitude of the inhibiting waveform W3 according to the output of the controller 93. The multiplier 104 adjusts the amplitude of the inhibiting waveform W4 according to the output of the controller 94.

The adders 113 through 116 add the driving waveform W0 generated by the driving waveform generator 3 and the inhibiting waveforms W1 through W4 after the amplitude adjustments, respectively, to superimpose the inhibiting waveforms W1 through W4 after the amplitude adjustments to the driving waveform W0. Hence, a corrected driving waveform, obtained by correcting the driving waveform W0, is output from the adder 116.

Accordingly, the second embodiment can quickly reduce the ringing components f1 and f2, similarly as in the case of the first embodiment that reduces the ringing component f1.

In each of the embodiments described above, the functions of the mirror driving device may be executed by a processor that executes a program stored in a nontransitory computer-readable storage medium. Such a processor may be formed by a Central Processing Unit (CPU), for example.

According to each of the embodiments described above, it is possible to reduce the ringing that is generated in the optical scanning device.

The description above use terms such as "determine", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," and "second," the ordinal numbers do not imply priorities of the embodiments.

Further, the present invention is not limited to these embodiments, but various variations, modifications, and substitutions of a part or all of the embodiments may be made without departing from the scope of the present invention.

For example, in the embodiments described above, The time width of the fall period Td is shorter than the time width of the rise period Tr, and thus, the fall period Td having the shorter time width is set to the time width that is an integer multiple of the inverse number of the natural resonant frequency f0. However, the time width of the rise period Tr may be shorter than the time width of the fall period Td. In this case, the rise period Tr having the shorter time width may be set to the time width that is an integer multiple of the inverse number of the natural resonant frequency f0.

What is claimed is:

1. A mirror driving device comprising:
a detector configured to output a detection signal having a ringing component included in oscillation of a mirror;
a driving waveform generator configured to generate a sawtooth driving waveform that oscillates the mirror;
a superimposing waveform generator configured to generate a superimposing waveform;
a circuit configured to superimpose the superimposing waveform to the sawtooth driving waveform;
a periodic, signal generator configured to generate a periodic signal having a frequency identical to or near a ringing frequency of the ringing, component;
a correlation calculator configured to calculate a correlation value between the periodic signal and the detection signal; and
an amplitude adjuster configured to dynamically adjust an amplitude of the superimposing waveform to reduce the ringing component, based on the correlation value.

2. The mirror driving device as claimed in claim 1, wherein the amplitude adjuster includes
a controller configured to perform a Proportional Integral (PI) control or a Proportional Integral Differential (PID) control that determines the amplitude based on the correlation value, and
a multiplier configured to adjust the amplitude according to an output of the controller.

3. The mirror driving device as claimed in claim 1, wherein the detector filters a sensor signal having a waveform that varies according to the oscillation of the mirror, to output the detection signal.

4. The mirror driving device as claimed in claim 1, wherein
the sawtooth driving waveform has a rise period in which a signal level rises, and a fall period in which the signal level falls, and
a period in which the periodic signal is output is one of the rise period and the fall period having a time width longer than the other of the rise period and the fall period.

5. An optical scan control apparatus comprising:
a mirror driving device according to claim 1; and
the optical scanning device including the mirror.

6. The mirror driving device as claimed in claim 1, wherein the correlation value corresponds to an accumulated value of products of the periodic signal and the detection signal.

7. The mirror driving device as claimed in claim 6, wherein the accumulated value includes a first correlation value between a sine wave signal forming the periodic signal and the detection signal, and a second correlation value between a cosine wave signal forming the periodic signal and the detection signal.

8. A mirror driving device comprising:
a detector configured to output a detection signal having a ringing component included in oscillation of a mirror;
a driving waveform generator configured to generate a sawtooth driving waveform that oscillates the mirror;
a superimposing waveform generator configured to generate a superimposing waveform to be superimposed to the sawtooth driving waveform;
a periodic signal generator configured to generate a periodic signal having a frequency identical to or near a ringing frequency of the ringing component;
a correlation calculator configured to calculate a correlation value between the periodic signal and the detection signal; and
an amplitude adjuster configured to adjust an amplitude of the superimposing waveform to reduce the ringing component, based on the correlation value,
wherein the correlation value corresponds to an accumulated value of products of the periodic signal and the detection signal.

9. The mirror driving device as claimed in claim 8, wherein the accumulated value includes a first correlation value between a sine wave signal forming the periodic signal and the detection signal, and a second correlation value between a cosine wave signal forming the periodic signal and the detection signal.

10. The mirror driving device as claimed in claim 8, wherein the amplitude adjuster includes
a controller configured to perform a Proportional Integral (PI) control or a Proportional Integral Differential (PID) control that determines the amplitude based on the correlation value, and
a multiplier configured to adjust the amplitude according to an output of the controller.

11. The mirror driving device as claimed in claim 8, wherein the detector filters a sensor signal having a waveform that varies according to the oscillation of the mirror, to output the detection signal.

12. The mirror driving device as claimed in claim 8, wherein
the sawtooth driving waveform has a rise period in which a signal level rises, and a fall period in which the signal level falls, and
a period in which the periodic signal is output is one of the rise period and the fall period having a time width longer than the other of the rise period and the fall period.

13. An optical scan control apparatus comprising:
a mirror driving device according to claim 8; and
the optical scanning device including the mirror.

14. A mirror driving device comprising:
a detector configured to output a detection signal having a ringing component included in oscillation of a mirror;
a driving waveform generator configured to generate a sawtooth driving waveform that oscillates the mirror;
a superimposing waveform generator configured to generate a superimposing waveform to be superimposed to the sawtooth driving waveform;
a periodic signal generator configured to generate a periodic signal having a frequency identical to or near a ringing frequency of the ringing component;
a correlation calculator configured to calculate a correlation value between the periodic signal and the detection signal; and
an amplitude adjuster configured to adjust an amplitude of the superimposing waveform to reduce the ringing component, based on the correlation value, wherein
the sawtooth driving waveform has a rise period in which a signal level rises, and a fall period in which the signal level falls, and
a period in which the superimposing waveform is superimposed to the sawtooth driving waveform is one of the rise period and the fall period having a time width shorter than the other of the rise period and the fall period.

15. The mirror driving device as claimed in claim 14, wherein the amplitude adjuster includes
a controller configured to perform a Proportional Integral (PI) control or a Proportional Integral Differential (PID) control that determines the amplitude based on the correlation value, and
a multiplier configured to adjust the amplitude according to an output of controller.

16. The mirror driving device as claimed in claim 14, wherein the detector filters a sensor signal having a waveform that varies according to the oscillation of the mirror, to output the detection signal.

17. The mirror driving device as claimed in claim 14, wherein
the sawtooth driving waveform has a rise period in which a signal level rises, and a fall period in which the signal level falls, and
a period in which the periodic signal is output is one of the rise period and the fall period having a time width longer than the other of the rise period and the fall period.

18. An optical scan control apparatus comprising:
a mirror driving device according to claim 14; and
the optical scanning device including the mirror.

19. A mirror driving method comprising:
computing a correlation value between a detection signal having a ringing component included in oscillation of a mirror, and a periodic signal having a frequency identical to Or near a ringing frequency of the ringing component;
superimposing a superimposing waveform to a sawtooth driving waveform that oscillates the mirror; and
dynamically adjusting an amplitude of the superimposing waveform, to reduce the ringing component, based on the correlation value.

* * * * *